BINARY DATA TRANSFER DEVICE

Filed March 20, 1957 2 Sheets-Sheet 1

INVENTOR.
JOSEPH WYLEN

BY

ATTORNEY

June 26, 1962 J. WYLEN 3,041,581

BINARY DATA TRANSFER DEVICE

Filed March 20, 1957 2 Sheets-Sheet 2

INVENTOR.
JOSEPH WYLEN
BY [signature]
ATTORNEY

United States Patent Office 3,041,581

Patented June 26, 1962

3,041,581

BINARY DATA TRANSFER DEVICE

Joseph Wylen, Broomall, Pa., assignor to Burroughs Corporation, Detroit, Mich., a corporation of Michigan Filed Mar. 20, 1957, Ser. No. 647,314
10 Claims. (Cl. 340—172.5)

The present invention relates to a system for the storage of binary data and more particularly to a magnetic memory device of the shift-register type wherein binary coded data may be permanently stored and thereafter used to energize a suitable output circuit as many times as may be required or desired.

Various types of conventional shift-register circuits have been used heretofore in electronic digital computers and the like in order to store and manipulate binary information. In these prior conventional shift-register circuits, however, it has been the usual practice to employ, with each data storage core of the memory, a so-called idler core for temporary storage of the binary information. Thus, when it is desired to advance the binary information of one storage core to the next storage core of the memory, the binary information in said one storage core must first be temporarily stored in the associated idler core until the next succeeding core of the memory is cleared for receipt of said binary information. This reduces the effective speed with which information may be inserted into and extracted from the memory and at the same time necessitates the use of two magnetic storage elements for each bit of information that is to be stored in the memory.

Accordingly, it is a principal object of the present invention to provide, for an electronic digital computer or the like, an improved shift-register type of memory device which is capable of storing binary information more efficiently than the prior-art devices.

It is a further object of the present invention to provide magnetic memory apparatus of the shift-register type wherein the required number of magnetic storage elements is substantially reduced.

Figures 1, 2A:
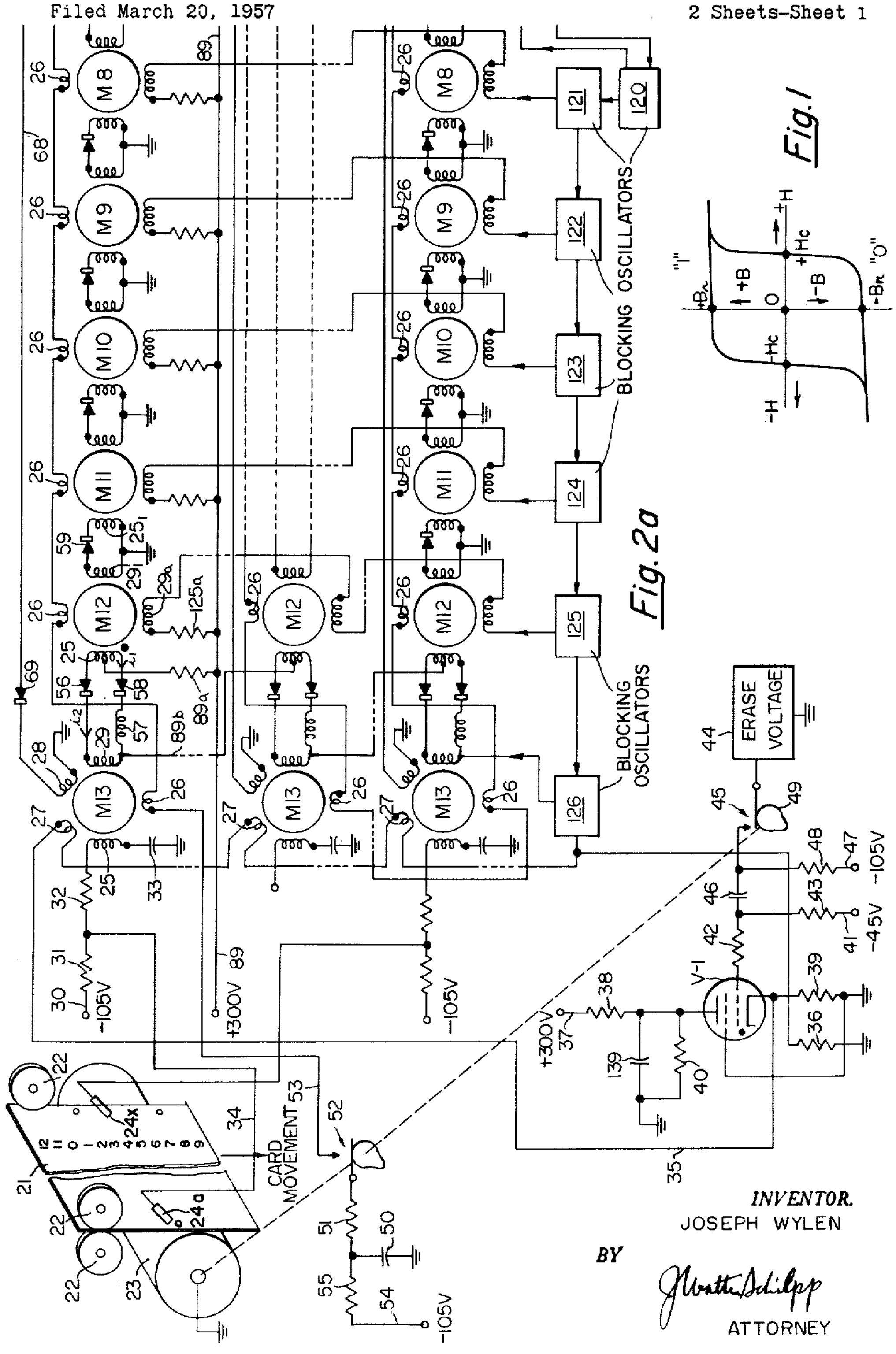
Figure 2B:
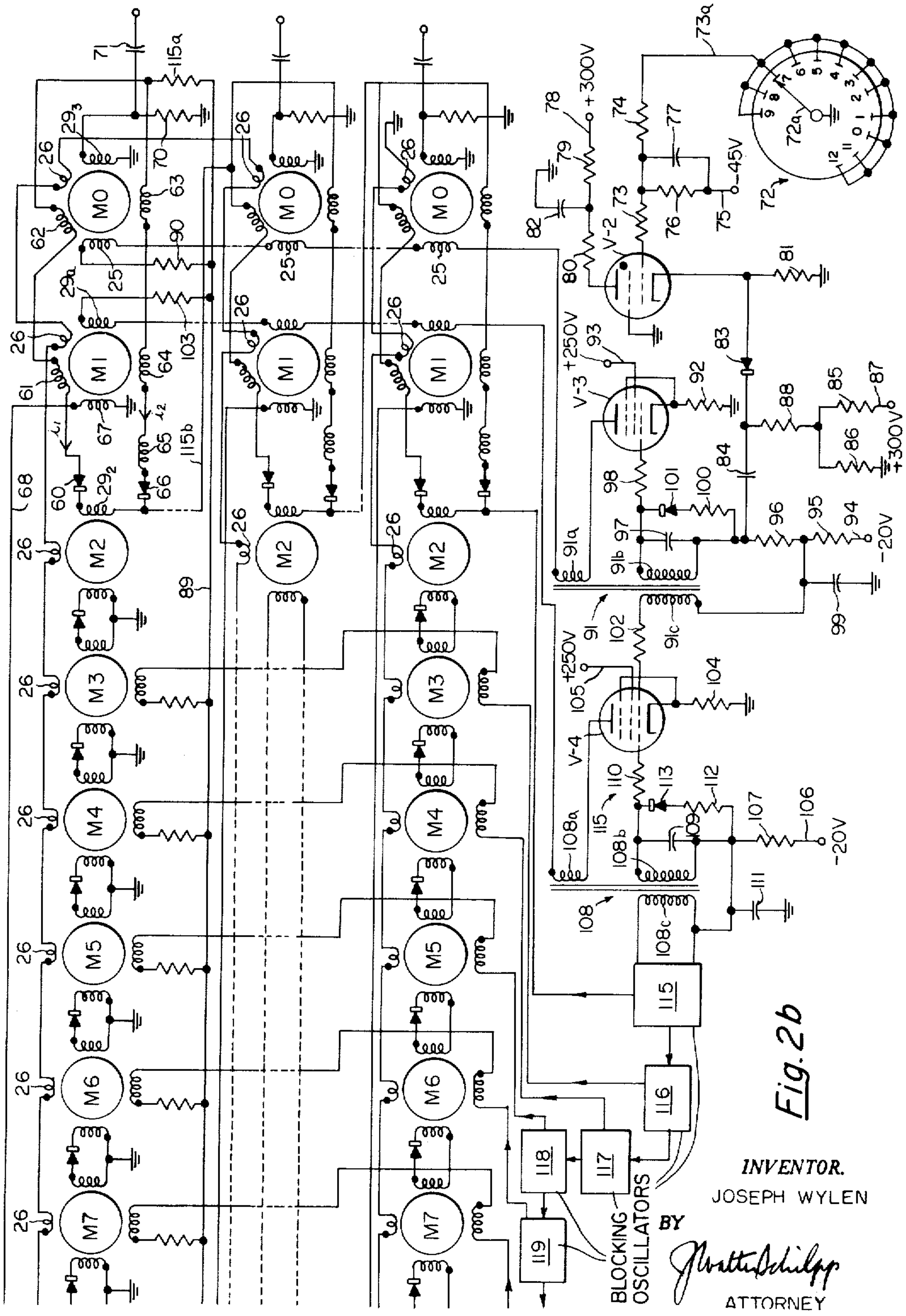

Other objects and the attendant advantages of the present invention will be more readily appreciated as the same becomes better understood by considering the following detailed description and the accompanying drawing wherein:

FIG. 1 is an idealized B–H hysteresis curve of a suitable magnetic core material used in the circuit of the present invention; and FIGS. 2*a* and 2*b* show, when placed side by side, a schematic view of a preferred embodiment of the present invention. The arrow heads on the drawings indicate the direction of information flow rather than the flow of conventional current; in those portions where it is intended to indicate the direction of conventional current the arrow head is accompanied by the designations $i_1$ and $i_2$ respectively.

In FIG. 1, the B–H curve of a magnetic material suitable for the purposes of the present invention is shown. The points $+B_r$ and $-B_r$ on the curve represent, respectively, the positive and negative remanent magnetic states of the core material after a magnetizing force, $+H$ or $-H$, has been impressed and removed. The magnetizing force which is impressed is developed by current flow of sufficient magnitude in one direction or the other through exciting windings of the core.

The condition of the core at states $+B_r$ and $-B_r$ is then arbitrarily taken to represent the storage therein of the binary digits "0" and "1" (or "1" and "0"). In order to write binary information into a core, a current of intensity sufficient to develop a magnetizing force greater than the critical magnetizing force $+H_c$ or $-H_c$ is passed in the proper direction through an energizing winding. In order to read out information stored in the core, a current sufficient to develop a magnetizing force greater than $+H_c$ or $-H_c$ is again applied to the energizing winding. If the reading force is $+H$ and the remanent state of the core is $+B_r$, there is little change in flux intensity within the core and only a relatively small voltage is induced in the output circuit. If, however, the core is in its negative remanent state $-B_r$ when the positive reading force $+H$ is applied, the core switches to state $+B_r$ and a substantial voltage is induced in the output circuit. Thus, a core having a relatively rectangular hysteresis characteristic such as is illustrated in FIG. 1, may readily be used to store binary information by arbitrarily associating the remanent polar states of the core with the binary digits "1" and "0," and may be used to read or detect the stored data by the application of a magnetizing force of known polarity.

In the detailed description of the invention which is to follow, it will be assumed that conventional current entering the terminal of a core winding bearing the dot notation develops a magnetizing force $-H$ and tends to switch the core to its negative remanent state $-B_r$ and that this state $(-B_r)$ represents the binary "0." Conversely, current entering the non-dot terminal of an energizing winding tends to switch the core toward its positive or binary "1" state. Moreover, it will be assumed that when a core is switched to its binary "0" remanent state, an appreciable positive potential is produced at the dot end of all windings coupled to the core, whereas when the core is switched to its binary "1" state, an appreciable positive potential is produced at the non-dot end of all windings coupled to the core.

Referring now to FIGS. 2*a* and 2*b* which illustrate a preferred embodiment of the present invention, in the upper left-hand portion of FIG. 2*a*, is shown a record card 21 which is preferably a well known type of conventional business machine punched card. Card 21 has a plurality, for example, sixteen vertical columns of ten digits each representing positions 9 to 0 and two control positions designated 11 and 12. The punched holes of each card may be read or sensed by a conventional card reading device. For example, as schematically shown, each card is advanced by feed rolls 22 over an electrically-grounded metal-surfaced cylindrical drum 23 and past card-reading brush elements or the like two of which are shown at **24*a* and 24*x*. Cards 21 are fed successively, preferably from a suitable conventional supply hopper or hoppers (not shown) between the feed rolls 22; the cards are conveyed with their 9's positions first past the row of sensing brushes such as brushes 24*a* and 24*x*. The brushes, of which there is one for each column of aperture positions on the record card, are spaced laterally in a line so as to sense concurrently like digits, represented by perforations in the various columns, by making contact through the perforation with the grounded contact roll or drum 23**.

Inasmuch as the energizing circuits and the core-transfer loop circuits for the various columns of the card are identical, the cores and circuitry associated with one column of the card only will be described herein in detail. However, a portion of the circuitry of the cores associated with other columns of the card is also shown in FIGS. 2*a* and 2*b*.

In FIGS. 2*a* and 2*b*, cores M13 through M0 of the top row are the cores associated with one column, i.e., the left end column read by brush **24*a*, while cores M13 through M0 of the bottom row are the cores associated with the right end column read by brush 24*x*. Since all of the rows of cores are identical, only the top row will be described in detail. Core M13 is provided with an input winding 25, a write clear winding 26, an erase winding 27, a feedback winding 28, and an output winding 29. The input winding 25 is included in a circuit extending from the negative 105-volt supply line 30 through resistors 31 and 32, winding 25 and condenser 33 to ground. Thus, condenser 33 is charged negatively. Brush 24***a*, which senses the presence or absence of perforations along the left end column of record card 21, in a manner which will be more apparent hereinafter, is connected by conductor 34 to the junction of resistors 31 and 32. The erase winding 27 of core M13 of the top row of cores is connected in series with the erase winding of each of the cores M13 of the other core rows of the memory and is driven by the cathode potential of a thyratron tube V–1. The circuit may be traced from the cathode of the tube V–1 through conductor 35, the various erase windings 27 of the M13 cores, and resistor 36 to ground. The plate circuit of tube V–1 extends from the positive 300-volt supply line 37 through resistor 38, the tube V–1 and resistor 39 to ground. The plate of tube V–1 is also preferably coupled to ground through the parallel-connected condenser 139 and resistor 40 which together control the firing cycle of the tube V–1 in a conventional manner. The suppressor grid of the thyratron tube V–1 is preferably connected to ground as shown, and its control grid is normally biased to cut-off by its connection to the negative 45-volt supply line 41 through resistors 42 and 43. The erase input source 44, which provides energy at a suitable value of positive potential, is connected to the control grid of thyratron tube V–1 through the cam-actuated switch 45, condenser 46 and resistor 42. The junction of condenser 46 and switch 45 is tied to the negative 105-volt supply line 47 through resistor 48. Cam 49, which determines the disposition of switch 45, rotates in synchronism with the card contact drum 23 in a manner which will be more apparent hereinafter. The write clear winding 26 of core M13 of the top row of cores is connected in series with the write clear windings of all of the other cores of the memory and is energized by a circuit that extends from the grounded condenser 50 through resistor 51, the cam-actuated switch 52, conductor 53 and the series-connected write clear windings 26 back to ground. The charging circuit for condenser 50 extends from the negative 105-volt supply line 54 through resistor 55 and condenser 50 to ground.

Opposite ends of output winding 29 of core M13 are coupled to the split input wind 25 of core M12 through diode 56, and choke 57 and diode 58, respectively. The output winding $29_1$ of core M12 is coupled as shown through the single diode 59 to the input winding $25_1$ of core M11. Similar single diode loop circuits interconnect the input and output windings of the electrically-adjacent magnetic cores M11 to M2. The output winding $29_2$ of core M2 forms a part of a biased diode type loop circuit that extends from one terminal of winding $29_2$ through diode 60, winding 61 of core M1, windings 62 and 63 or core M0, winding 64 of core M1, inductor 65 and diode 66 to the other terminal of winding $29_2$ of core M2. The winding 67 of core M1 is electrically connected to the feedback winding 28 of core M13 in a circuit that extends from ground through winding 67 of core M1, conductor 68; diode 69, and winding 28 of core M13 to ground. The output winding $29_3$ of core M0 is coupled to a suitable output load circuit in any suitable manner, as for example, by means of the network comprising resistor 70 and condenser 71.

Shown in the lower right-hand portion of FIG. 2*b* is the emitter disc member 72 having peripherally located electrically conductive segments numbered 9 to 0, 11 and 12. Emitter 72 is provided with a rotatable arm 72*a* one end of which is preferably connected to ground and the other end of which is advanced from one conductive segment to another in synchronism with movement of the record card through the card reading device. The various segments of the emitter 72 are electrically connected to the control grid of thyratron tube V–2 through series resistors 73 and 74. The junction of resistors 73 and 74 is tied to the negative 45-volt supply line 75 through the parallel-connected resistor 76 and condenser 77. The plate circuit of thyratron tube V–2 extends from the positive 300 volt-supply line 78 through resistors 79 and 80, the tube V–2, and resistor 81 to ground. The suppressor grid of tube V–2 is tied to ground, and the quenching-circuit condenser 82 is preferably coupled between the junction of resistors 79 and 80 and ground. The cathode of tube V–2 is coupled to the control grid of the blocking oscillator circuit of pentode tube V–3 through a circuit that includes the series-connected diode 83 and condenser 84. A point on a voltage-divider network, located between the series-connected resistors 85 and 86, is connected to the junction of condenser 84 and diode 83 through resistor 88. The voltage-divider network extends between ground and the positive 300-volt supply line 87. The plate circuit of pentode V–3 extends from the positive 300-volt supply line 89 through resistor 90, windings 25 of each of the M0 cores of the various rows of cores, the plate winding 91*a* of transformer 91, the tube V–3, and resistor 92 to ground. The suppressor grid of tube V–3 is preferably connected to its cathode as shown and its screen grid is tied to the positive 250-volt supply line 93. The control grid of tube V–3 is normally biased to cut-off by means of a circuit that extends from the negative 20-volt supply line 94 through the series-connected resistors 95 and 96, the grid tank circuit which comprises the parallel-connected winding 91*b* of transformer 91 and condenser 97, and through resistor 98 to the control grid of tube V–3. Condenser 99 is provided to A.-C. couple the junction of resistors 95 and 96 to ground. The series-connected resistor 100 and diode 101 are preferably connected in parallel with the grid tank circuit of tube V–3 as shown. The output winding 91*c* of transformer 91 is coupled to the control grid of pentode tube V–4, and to the grid-biasing supply line 94 through resistors 102 and 95. The plate circuit of pentode V–4 extends from the positive 300-volt supply line 89 through resistor 103, windings 29*a* of each of the M1 cores of the various rows of cores of the memory, through the plate winding 108*a* of transformer 108, the tube V–4, and resistor 104 to ground. The suppressor grid of tube V–4 is preferably connected to its cathode as shown, and its screen grid is tied to the positive 250-volt supply line 105. The control grid of tube V–4 is normally biased to cut-off by means of a circuit that extends from the negative 20-volt line 106 through resistor 107, the grid tank circuit that includes the parallel-connected winding 108*b* of transformer 108 and condenser 109, and through resistor 110 to the control grid of V–4. Condenser 111 is provided to A.-C. couple the junction of resistor 107 and the grid tank circuit to ground. The series-connected resistor 112 and diode 113 are preferably connected in parallel with the grid tank circuit, as shown. The blocking-oscillator driver circuit 115, which is identical to the blocking oscillator circuit just described for windings 29*a* of the M1 cores, is driven by the output winding 108*c* of transformer 108 and is coupled to the various other blocking oscillators 116 to 126, inclusive for energization of their respective M3 to M13 core windings in a manner which will be more apparent hereinafter.

In the operation of the above described apparatus prior to the time when the record card 21 is fed between feed rolls 22 of the card reading apparatus, cam 52, which rotates in synchronism in a suitable manner with the rotating drum 23, closes the "write clear" contacts of switch 52 so that condenser 50 discharges its stored energy through the series-connected single-turn windings 26 that link together all of the cores of the memory device. The flow of current from condenser 50 enters the dot terminal of each of the windings 26, and accordingly each of the cores of the memory is preset to binary "0." The memory is now prepared for the transfer of data from the card 21 thereinto. Just prior to the time that the "9" hole in the record card passes under the brush 24*a* of the card reading apparatus, the erase cam 49, which also rotates in synchronism with the drum 23, closes switch 45. This completes a circuit that provides the control grid of thyratron tube V–1 with a suitable positive pulse from the energy supply source 44.

When thyratron tube V–1, which is normally biased to cut-off by the negative 45-volt supply line 41, fires, the increase of potential at its cathode produces suitable current flow through the series-connected windings 27 of the various input M13 cores. This current flow is into the dot end of the windings 27 and ensures that all of the M13 cores remain in, or are returned to, their binary "0" states. This prevents an M13 core from being in the "1" state as a result of its brush having contacted the drum 23 and written a "1" into the input core just before the lower, i.e., leading, edge of the card insulated the brush from the drum surface.

The data storage device is now prepared for the storage of information sensed from the record card. In order to explain the read-in operation of the device, it will be assumed that record card 21 is provided with a perforation or punch in the "5" hole position of the left-hand column read by brush 24*a*. It will be understood of course that the read-in procedure is the same irrespective of which one or more of the hole positions of the column is punched.

When the "9" position of card 21 reaches the reading area of brush 24*a*, there being no perforation in the card at this position, conductor 34 remains insulated from the drum 23, condenser 33 remains charged, and no current pulse flows through input winding 25 of core M13. Thus, core M13 remains in its negative remanent or binary "0" state. However, the arm 72*a* of the emitter device 72, which rotates in synchronism with drum 23, engages segment "9" momentarily after the "9" position of the record card 21 is disposed in the reading area, and grounds the line 73*a*. Resistor 74 is of relatively low value compared with that of resistor 76, and the potential of the control grid of thyratron tube V–2 is raised from the negative 45-volt value of line 75 substantially to ground. The thyratron tube V–2 fires and its cathode potential is raised suddenly. A positive pulse is thus fed through diode 83 and condenser 84 to the grid input circuit of the normally cut-off pentode V–3.

Pentode V–3 and its associated circuits are connected as a conventional single-swing blocking oscillator. Accordingly, when the pulse from the cathode of thyratron tube V–2 drives the control grid of pentode V–3 positive and V–3 conducts, plate current flows into the dot ends of each of the series-connected input windings 25 of the output cores M0 and tends to switch the M0 cores to their "0" states. However, since a binary "0" is already stored in the cores M0 as a result of the "write clear" signal previously referred to, the states of the cores M0 remain unchanged and no appreciable signal is delivered to the output circuits.

The tube V–3 operates as a conventional single-swing blocking oscillator, and so long as the plate current of tube V–3 continues to increase, the plate winding 91*a* of transformer 91 induces a positive feedback potential at the dot end of the grid winding 91*b*, thereby causing the plate current of V–3 to increase still further. The rise of current through the plate winding 91*a* also induces a negative potential at the non-dot end of output winding 91*c* and this is applied to the control grid of pentode tube V–4. This maintains tube V–4 cut off. When the plate current of tube V–3 reaches saturation, however, the flux change in transformer 91 is reduced, thereby reducing the induced voltage in grid winding 91*b*. The plate current through tube V–3 decreases, and the magnetic field of transformer 91 collapses. The collapsing field induces a voltage in the grid winding 91*b* which is negative at the dot end, causing the grid of V–3 to become more negative, and this continues until tube V–3 is cut off.

The collapsing field of transformer 91 induces a positive pulse at the non-dot end of winding 91*c* and this appears on the control grid of tube V–4. Tube V–4 then conducts and the flow of plate current into the dot ends of windings 29*a* of cores M1 tends to switch cores M1 to their binary "0" state. However, cores M1 are already in their "0" state as a result of the "write clear" signal and no pulse is developed in the output circuit of cores M1 to disturb the "0" state of cores M0.

Blocking oscillator circuits 115–126, which are shown in block form, operate in a manner similar to that described above with respect to tubes V–3 and V–4, and oscillators 115 to 126 are successively energized one after another in that order in the same manner in which tube V–4 is energized a predetermined interval after the energization of tube V–3. Thus, oscillator tubes V–3 and V–4 and oscillators 115 to 126 provide fourteen successive individual current pulses for energization of cores M0 to M13. Thus, as each segment 9 to 0, 11 and 12 of emitter 72 is grounded through the rotating arm 72*a*, data stored in each core of the memory is successively transferred to its next succeeding core and at the same time each core is cleared in preparation for the transfer thereinto of data from a preceding core.

Returning now to the assumed condition that there is no perforation in the "9" position of the left-hand column of card 21, read by brush 24*a*, it will be seen that since, as a result of the "write clear" signal, the top-row core M13 is already in its "0" state when oscillator 126 sends current into the dot end of winding 29, the core M13 undergoes no change in its state. Without a substantial flux change in core M13, core M12, which is coupled to the output winding 29 of core M13, also remains in its "0" state.

Consider now what happens when brush 24*a* reaches the "5" position which has been assumed to contain a punch or perforation. When brush 24*a* is grounded through the aperture in the "5" position, condenser 33 discharges through input winding 25 of core M13. Since condenser 33 had been charged negatively by the negative source 30, the discharge current enters the non-dot side of winding 25 and establishes a magnetizing force +H which shifts core M13 from its "0" to its "1" state.

When the control grid of thyratron tube V–2 is raised to ground potential by reason of arm 72*a* contacting segment "5" of emitter 72, another series of fourteen successive pulses is provided by oscillator tubes V–3, V–4 and oscillators 115 through 126. The plate current of oscillator 126 flows from the positive 300-volt supply line 89 through resistor 89*a* and then divides into substantially equal parts each of which flows through one of two branch paths, one path comprising the upper half of input winding 25 of core M12, diode 56 and output winding 29 of core M13 and the other path comprising the lower half of winding 25, diode 58, and inductor 57. The combined currents then flow through conductor 89*b*, and then again divide through the split-winding loop circuits of the M13 cores of the other rows of the memory. Since core M13 is now in its "1" state, the branch current $i_2$ which flows into the dot end of winding 29 of core M13 switches core M13 back to its "0" state. When core M13 switches, a back voltage is induced which opposes the flow of the current $i_2$. This produces an appreciable unbalance in the magnitude of the currents $i_1$ and $i_2$ in winding 25 of core M12, such that current $i_1$ is large compared with current $i_2$. Since the relatively large branch current $i_1$ enters the non-dot terminal of winding 25 of core M12, the core M12 switches from the "0" to the "1" state.

When the "4" position of card 21 passes under the reading brush 24*a*, it being assumed that there is no perforation in the card at this position, winding 25 of core M13 is not energized and core M13 remains in its "0" state. When arm 72*a* of emitter 72 contacts segment "4" and raises to ground potential the control grid of tube V–2, the tube V–2 fires and thereafter tubes V–3, V–4 and oscillators 115 to 126 are successively energized. The plate current of oscillator 125 flows from the positive 300-volt supply line 89 through resistor 125a, winding 29a of core M12, and then through each of windings 29a of the other M12 cores. This current enters the dot end of winding 29a of core M12 of the top row causing it to switch from the "1" state in which it resided to the "0" state. When top-row core M12 shifts, a positive pulse is induced at the dot end of its output winding 29 and current flows through diode 59, and into the non-dot end of winding $25_1$ of core M11. This current entering the non-dot terminal of winding $25_1$ of core M11 switches the core from its "0" to its "1" state, thereby transferring the binary "1" formerly stored in core M12 to core M11.

It has been assumed for purposes of explanation that each of the remaining digit and control positions 3 to 0 and 11, 12 of the left-hand column of card 21 is unperforated. Hence, no additional "1" is written into core M13, and none additional is transferred to the succeeding cores of the memory. However, as the arm 72a rotates, additional series of pulses from oscillator tubes V–3, V–4 and oscillators 115 to 126 are produced as the arm makes contact with segments 3 to 0, 11 and 12, and the binary "1" in core M11 is advanced one core to the right for each pulse series. When all of the digit and control positions of the left-hand column of card 21 have been read, the top-row core M5, corresponding to the "5" position on card 21, stores the binary "1," and each of the other cores of the top row of the memory occupies the binary "0" state.

When the binary data which has been stored in the top row of cores is to be read out, the ground connection through the brush 24a is broken in any suitable manner. As the arm 72a of the emitter 72 successively engages and grounds each of the contact positions, 9 to 0, 11 and 12, tube V–2 is fired and each of the blocking oscillator circuits, V–3, V–4 and 115 to 126 successively energizes the input windings 29a or 25 as the case may be of cores M0 to M13 to advance the binary data stored therein along to the next succeeding core in a manner similar to the above-described write-in operation. Thus, in the present illustration, in reading out the binary "1" stored in top-row core M5, the "1" is successively advanced to the right from core to core until it is temporarily stored in core M2. With the next series of pulses from oscillator tubes V–3, V–4 and oscillators 115 to 126, the current pulse of oscillator 115 flows from the positive 300-volt supply line 89 through resistor 115a, (shown in the upper right portion of FIG. 2b) through a pair of branch paths (one of which includes winding 62 of core M0, winding 61 of core M1, diode 60 and winding $29_2$ of core M2, and the other of which includes winding 63 of core M0, winding 64 of core M1, inductance 65, and diode 66), through conductor 115b and the other M2 split-loop circuits of the other rows of the memory. The branch current $i_1$ enters the dot side of winding $29_2$ of core M2 and switches core M2 to its "0" state. The back voltage induced in winding $29_2$ of core M2, when core M2 switches, opposes the flow of current $i_1$, with the result that the magnitude of current $i_1$ is substantially smaller than the other branch current $i_2$. Since the relatively large branch current $i_2$ enters the non-dot ends of windings 63 and 64 of cores M0 and M1, respectively, the cores M0 and M1 both switch from their "0" states to their "1" states.

When the oscillator tubes V–3, V–4 and oscillators 115 to 126 are next energized in response to the movement of arm 72a, the current pulse from the oscillator circuit of tube V–3 passes from the positive 300-volt supply line 89 through resistor 90, winding 25 of top-row core M0 and each of the windings 25 of the other M0 cores of the memory. This current pulse enters the dot side of winding 25 of core M0 and switches the core from its "1" state to its "0" state. When this occurs, a positive potential is induced at the dot extremity of the output winding $29_3$ of core M0 which energizes the output circuit of the memory through condenser 71.

The present memory system is rendered non-destructive during read-out by energizing the feedback winding 28 of core M13 with current from the winding 67 of core M1. It will be observed that when the oscillator tube V–4 is energized, a current pulse is directed from the positive 300-volt line 89 through resistor 103, winding 29a of core M1, and each of the other 29a windings of the other M1 cores of the memory. The current of this pulse enters the dot side of winding 29a of core M1 and switches that core from its "1" to its "0" state. In so doing, a positive potential is induced at the dot end of winding 67 of core M1 and current flows from said winding through diode 69 and into the non-dot end of winding 28 of core M13. This current switches core M13 to its "1" state so that during the next succeeding series of pulses from the oscillator tubes V-3, V–4 and oscillators 115 to 126, the binary "1" in core M13 is advanced into core M12. Thereafter, the said binary "1" is advanced to the right from core to core until, after each of the segments of emitter 72 have been contacted to initiate an individual series of pulses through the oscillator tubes V–3, V–4 and oscillators 115 to 126, and the read-out operation is completed, the said binary "1" is returned to core M5 where it was originally stored. In this way, memory of FIGS. 2a and 2b is rendered non-destructive.

What is claimed is:

1. Apparatus for transferring binary data from a unit record medium to a magnetic core register, said apparatus comprising, in combination: a unit record medium having $n$ data positions linearly aligned for successive sensing; a register comprising a series of $(n+2)$ bistable magnetic cores including transfer means forward coupling each core to the next adjacent core, except that forward transfer means from the next-to-last core to the last core is omitted, the last core as well as the next-to-last core being coupled back to the core next preceding the next-to-last core; feedback means coupling the next-to-last core to the first or input core; output means coupling the last core to an output line; means for transporting said record medium past a sensing station; means at said sensing station coupled to said first or input core and responsive to data recorded successively at said $n$ data positions for placing said first core successively in one or the other of its two stable states according to the data recorded successively on said medium; switch means operating in synchronism with said moving record medium; a series of $(n+2)$ single-shot blocking oscillators coupled in tandem; means coupling each blocking oscillator to a corresponding one of said cores; means actuated by said switch means in timed relation to the arrival of one of said $n$ data positions at said sensing station means for triggering the last blocking oscillator, means for in turn triggering individually and successively the entire series of tandem-coupled oscillators means for providing, as each of said $n$ data positions arrives at said sensing station, a series of $(n+2)$ advance pulses, each for individual and successive application to a corresponding one of said cores beginning with the output core and ending with the input core, means for effecting in timed relation to the sensing at each data position a one-core advance of the data in the register beginning with the last core and ending with the first or input core in that order, whereby at the termination of the sensing of a unit record medium the data recorded at all of said $n$ positions is lodged in the register, the individual data from each record position being lodged in the core occupying a corresponding position in the core register, and whereby, by virtue of said feedback means, the data in said storage register is non-destructively extractable at any subsequent time.

2. Apparatus for transferring binary data from a unit record medium to a storage register, including, in combination; a register comprising a series of bistable storage elements coupled in tandem; means for transporting said record medium past a read station; means at said read station coupled to the first bistable element and responsive to data recorded at successive data positions on said record medium for placing said first element successively in one or the other of its two stable states according to the data successively recorded; switch means operating in synchronism with the movement of the record medium; a series of single-shot blocking oscillators coupled in tandem, there being one oscillator for each bistable storage element; means coupling each blocking cessively in one or the other of its two stable states actuated by said switch means in time relation to the arrival to one of said data positions at said read station for triggering the last blocking oscillator thereby to trigger off the entire series of tandem-coupled oscillators in succession in reverse order for providing, as each one of said data positions arrives at said read station, a series of successive advance pulses equal in number to the number of storage elements; and means for applying each advance pulse individually to a corresponding one of said elements in successive order beginning with the output core and ending with the input core for effecting in time relation to the arrival of each data position at the read station a one step move-up of the data in the register beginning with the last element and ending with the first, whereby at the termination of the reading of the unit record medium the data recorded at all of the said record positions are lodged in the register, the individual data from each record position being lodged in the storage element occupying a corresponding position in the register.

3. Apparatus as claimed in claim 2 characterized by the provision of means for deriving output signals from the last element of the register.

4. Apparatus for transferring binary data from a unit record medium to a magnetic core register, comprising, in combination, a unit record medium having $n$ data positions to be successively sensed; a register of $(n+2)$ bistable magnetic cores coupled in tandem; means, including sensing means, coupling said record medium to the first core of said register for placing said first core successively in one or the other of its two stable states according to the data recorded at successive positions on said record medium; means operating in time relation with said record medium for developing a series of $(n+2)$ advance pulses for each data position on the record medium; means for applying said pulses individually and sucessively to corresponding ones of said magnetic cores in successive order beginning with the last core and ending with the first core for effecting in time relation to the coupling of each data position on the record medium to the first core of the register a one-core advance of the data in the register beginning with the last core and ending with the first core in that order; means for taking an output signal from the last core in the series; and feedback means coupling the next-to-last core to the first core for enabling non-destructive read-out of said register.

5. Apparatus for transferring binary data from a unit record medium to a storage register, including, in combination; a register comprising a series of bistable storage elements coupled in tandem; means for transporting said record medium past a read station; means at said read station coupled to the first bistable element and responsive to data recorded at successive data positions on said record medium for placing said first element successively in one or the other of its two stable states according to the data successively recorded; switch means operating in synchronism with the movement of the record medium; a series of single-shot blocking oscillators coupled in tandem, there being one oscillator for each bistable storage element; means coupling each blocking oscillator to a corresponding storage element; means actuated by said switch means in time relation to the arrival to one of said data positions at said read station for triggering the last blocking oscillator thereby to trigger off the entire series of tandem-coupled oscillators in succession in reverse order for providing, as each one of said data positions arrives at said read station, a series of successive advance pulses equal in number to the number of storage elements; and means for applying each advance pulse individually to a corresponding one of said elements in successive order beginning with the output bistable storage element and ending with the input bistable storage element for effecting in time relation to the arrival of each data position at the read station a one step move-up of the data in the register beginning with the last element and ending with the first, whereby at the termination of the reading of the unit record medium the data recorded at all of the said record positions are lodged in the register, the individual data from each record position being lodged in the storage element occupying a corresponding position in the register, and feedback means coupling the next-to-last storage element to the first storage element thereby to enable the data in said register to be extracted non-destructively.

6. Apparatus for transferring binary data from a unit record medium to a storage register, including, in combination; a register comprising a series of bistable storage elements coupled in tandem; means for transporting said record medium past a read station; means at said read station coupled to the first bistable element and responsive to data recorded at successive data positions on said record medium for placing said first element successively in one or the other of its two stable states according to the data successively recorded; switch means operating in synchronism with the movement of the record medium; a series of single-shot blocking oscillators coupled in tandem, there being one oscillator for each bistable storage element; means coupling each blocking oscillator to a corresponding storage element; means actuated by said switch means in time relation to the arrival to one of said data positions at said read station for triggering the last blocking oscillator thereby to trigger off the entire series of tandem-coupled oscillators in succession in reverse order for providing, as each one of said data positions arrives at said read station, a series of successive advance pulses equal in number to the number of storage elements; and means for applying each advance pulse individually to a corresponding one of said elements in successive order beginning with the output bistable storage element and ending with the input bistable storage element for effecting in time relation to the arrival of each data position at the read station a one step move-up of the data in the register beginning with the last element and ending with the first, whereby at the termination of the reading of the unit record medium the data recorded at all of the said record positions are lodged in the register, the individual data from each record medium being lodged in the storage element occupying a corresponding position in the register, feedback means coupling the next-to-last storage element to the first storage element thereby to enable the data in said register to be extracted non-destructively, and means for deriving output signals from the last element of the register.

7. Apparatus for transferring binary data from a read station to a memory device comprising, in combination, record media arranged to be advanced through said read station, each record unit medium being provided with columns of $n$ markings for storing control and intelligence data in binary one's or zero's, where $n$ is any integer 1, 2 . . . $n$, a register comprising a plurality of bistable static storage elements arranged in cascade there being one cascaded group of $(n+2)$ bistable static storage elements for each of said columns, each bistable static storage element being adapted respectively to store a one or a zero in accordance with the respective marking in the associated column, signal means arranged to be triggered in synchronism with the movement of the record unit medium as it is successively sensed at the read station, said signal means providing $(n+2)$ pulses at the sensing of each of said $n$ markings respectively, circuit means connected respectively to each of said bistable static storage elements for applying each of said $(n+2)$ pulses to its respective bistable static storage element in sequence to drive the respective bistable static storage element to a reference state, whereby the binary information is advanced successively through the cascaded bistable static storage elements when the remanent state of the preceding bistable static storage element is changed.

8. Apparatus for transferring binary data from a read station to a memory device comprising, in combination, record media arranged to be advanced through said read station, each record unit medium being provided with columns of $n$ markings for storing control and intelligence data in binary one's or zero's where $n$ is any integer 1, 2 . . . $n$, a register comprising a plurality of bistable static storage elements arranged in cascade there being one cascaded group of $(n+2)$ bistable static storage elements for each of said columns, each bistable static storage element being adapted respectively to store a one or a zero in accordance with the respective marking in the associated column, signal means arranged to be triggered in synchronism with the movement of the record unit medium as it is successively sensed at the read station, said signal means providing $(n+2)$ pulses at the sensing of each of said $n$ markings respectively, circuit means connected respectively to each of said bistable static storage elements for applying each of said $(n+2)$ pulses to its respective bistable static storage element in sequence to drive the respective bistable static storage element to a reference state, means for disabling the transfer of information from the read station to the first of said bistable static storage elements in each of said groups during readout, whereby the binary information is advanced through the cascaded bistable static storage elements when the remanent state of the preceding bistable, static storage element is changed, the $(n+2)$ bistable static storage elements providing an output during read-out.

9. Apparatus for transferring binary data from a read station to a memory device comprising, in combination, record media arranged to be advanced through said read station, each record unit medium being provided with columns of $n$ markings for storing control and intelligence data in binary one's or zero's, where $n$ is an integer 1, 2 . . . $n$, a register comprising a plurality of bistable static storage elements arranged in cascade there being one cascaded group of $(n+2)$ bistable static storage elements for each of said columns, each bistable static storage element being adapted respectively to store a one or a zero in accordance with the respective marking in the associated column, a feedback path connecting the $(n+1)^{th}$ bistable static storage element to the first bistable static storage element in each cascaded grouping, said feedback path cooperating with said first static storage element drive said first bistable element to a non-reference state when the $(n+1)^{th}$ bistable static element changes its remanent state, signal means arranged to be triggered in synchronous with the movement of the record unit medium as it is successively sensed at the read station, said signal means connected respectively to each of said bistable static storage elements for applying each of said $(n+2)$ pulses to its respective bistable static storage element in sequence to drive said respective elements to a reference state, means for disabling the transfer of information from the read station to the first of said bistable static storage elements in each of said groupings during read-out, whereby the binary information is advanced through the cascaded bistable static storage elements when the remanent state of any bistable static storage is changed, and at the conclusion of the read-out process, the remanent state of each bistable static storage element will be the same at its respective marking on the record unit medium, thereby providing a non-destructive memory.

10. Apparatus for transferring binary data from a read station to a memory device comprising, in combination, record media arranged to be advanced through said read station, each of said record unit medium being provded with columns of $n$ markings for storing control and intelligence data in binary one's or zero's where $n$ is in any integer 1, 2 . . . $n$, a register comprising a plurality of bistable static storage elements arranged in cascade there being one cascaded group of $(n+2)$ bistable static storage elements for each of said columns, each bistable static storage element being adapted respectively to store a one or a zero in accordance with the respective marking in the associated column, means for clearing said bistable static elements prior to read-in by placing said bistable static elements in a reference remanent state, a feedback path connecting the $(n+1)^{th}$ bistable static storage element to the first bistable static storage element in each cascaded grouping, said feedback path cooperating with said first bistable static storage element to drive said first bistable element to the non-reference state when the $(n+1)^{th}$ bistable static storage element changes its remanent state, signal means arranged to be triggered in synchronism with the movement of the record unit medium as it is successively sensed at the read station, said signal means providing $(n+2)$ pulses at the sensing of each of said $n$ markings respectively, circuit means connected respectively to each of said bistable static storage elements for applying each of said $(n+2)$ pulses to its respective bistable static storage element in sequence to drive said respective bistable static storage element to a reference state, means for disabling the transfer of information from the read station to the first of said bistable static storage elements in each of said groupings during read-out, output means for developing an output signal from the $n^{th}$ core of each of said groupings, whereby the binary information is advanced through the cascaded bistable static storage elements when the remanent state of any bistable static storage element is changed, and at the conclusion of the read-out process, the remanent state of each bistable static storage element will be the same at its respective marking on the record unit medium thereby providing a non-destructive memory.

References Cited in the file of this patent

UNITED STATES PATENTS

| | | |
|---|---|---|
| 2,654,080 | Browne | Sept. 29, 1953 |
| 2,750,113 | Coleman | June 12, 1956 |
| 2,750,580 | Rabenda | June 12, 1956 |
| 2,781,503 | Saunders | Feb. 12, 1957 |
| 2,782,398 | West | Feb. 19, 1957 |
| 2,846,669 | McMillan et al. | Aug. 5, 1958 |
| 2,881,412 | Loev | Apr. 7, 1959 |
| 2,884,621 | Ross | Apr. 28, 1959 |
| 2,911,622 | Ayres et al. | Nov. 3, 1959 |

OTHER REFERENCES

EDVAC, Progress Report No. 2, June 30, 1946, pages 4—22, 4—23, Py-O-164; Py-O-165.